(12) United States Patent
Zhu

(10) Patent No.: US 12,144,272 B1
(45) Date of Patent: Nov. 19, 2024

(54) SELF-CLEANING LAWN SPIKE

(71) Applicant: Guanghua Zhu, Nanchang (CN)

(72) Inventor: Guanghua Zhu, Nanchang (CN)

( * ) Notice: Subject to any disclaimer, the term of this patent is extended or adjusted under 35 U.S.C. 154(b) by 0 days.

(21) Appl. No.: 18/649,053

(22) Filed: Apr. 29, 2024

(30) Foreign Application Priority Data

Jan. 17, 2024 (CN) .......................... 202420109089.4

(51) Int. Cl.
*A01B 1/24* (2006.01)
(52) U.S. Cl.
CPC .................................. *A01B 1/243* (2013.01)
(58) Field of Classification Search
CPC ....................................................... A01B 1/243
USPC ............................................................ 172/21
See application file for complete search history.

(56) References Cited

U.S. PATENT DOCUMENTS

| | | | | |
|---|---|---|---|---|
| 3,180,427 A * | 4/1965 | Leeper, Jr. | ............. | A01B 1/243 111/99 |
| 4,791,995 A * | 12/1988 | Hochlan, Jr. | ............ | A01B 1/06 111/99 |
| 5,152,348 A * | 10/1992 | Flanagan, Sr. | ....... | A01B 45/023 111/99 |
| 6,223,456 B1 * | 5/2001 | Hawkins | ................... | A43B 3/00 36/136 |
| 6,389,714 B1 * | 5/2002 | Mack | ...................... | A43C 15/14 36/61 |
| 9,925,438 B1 * | 3/2018 | Paz | ........................ | A01B 1/243 |
| D1,031,234 S * | 6/2024 | Jiang | ............................. | D2/962 |
| 2013/0048321 A1 * | 2/2013 | Xin | ........................ | A01B 1/243 172/22 |

FOREIGN PATENT DOCUMENTS

| | | | | |
|---|---|---|---|---|
| CN | 204325847 U | | 5/2015 | |
| CN | 212970956 U | | 4/2021 | |
| CN | 117359565 A | | 1/2024 | |
| DE | 2825036 A | * 12/1979 | ............. A01B 1/243 |
| GB | 2449628 A | * 12/2008 | ........... A43C 15/168 |
| JP | H10276805 A | * 10/1997 | |
| JP | H10201502 A | * 1/1998 | |
| JP | 3106804 U | * 7/2004 | |

* cited by examiner

*Primary Examiner* — Gary S Hartmann
(74) *Attorney, Agent, or Firm* — George D. Morgan

(57) ABSTRACT

Disclosed is a self-cleaning lawn spike, which includes a shoe board, a bottom surface of the shoe board having a plurality of vertically downward protruding cleats, a floating board is disposed below the shoe board, and the floating board is provided with through holes corresponding to cleats one by one, and the cleats are movably connected to corresponding through holes; a rebound device is disposed between the shoe board and the floating board; the rebound device pushes the floating board downward, but not beyond the tips of the cleats, effectively removing leaves, soil and other debris caught on the cleats during puncturing.

7 Claims, 5 Drawing Sheets

SELF-CLEANING LAWN SPIKE

CROSS-REFERENCE TO RELATED APPLICATIONS

The application claims priority to Chinese patent application No. 2024201090894, filed on Jan. 17, 2024, the entire contents of which are incorporated herein by reference.

TECHNICAL FIELD

The present application pertains to the technical field of gardening tools, particularly to a self-cleaning lawn spike.

BACKGROUND

In lawn care programs, it is usually necessary to puncture and perforate the lawn to loosen the soil, increase the permeability of the lawn, and promote the growth of grass roots to greater depths, which can on the one hand improve surface drainage and promote the absorption of nutrients from the surface by the grass roots, and on the other hand, it is also conducive to reseeding the grass.

In the prior art, it has disclosed a spike for puncturing and perforating a lawn, the structure of which is mostly as disclosed in the Chinese present applications numbered CN212545816U and CN214710842U, which implements the basic wearable function of the mud shoe.

However, the applicant has found in practice that when the user wears the lawn spike as disclosed in the above mentioned prior art for puncturing and perforating the lawn, the bottom of the mud shoes will trap leaves, soil and other debris, and with the progress of the work, the leaves, soil and other debris caught on the bottom of the mud shoes will gradually increase, the bottom of the shoes will become thicker and slipperier, which will make it progressively more difficult for the user to perform the puncturing and perforating of the lawn.

SUMMARY

The present application is intended to address the above deficiencies of the prior art and provide a self-cleaning lawn spike, which facilitates the removal of debris from the bottom of the mud shoe when puncturing and perforating the lawn.

In order to achieve the above purpose, the present application adopts the following technical solution:
a self-cleaning lawn spike includes a shoe board for wearing on a sole of a foot, a bottom surface of the shoe board having a plurality of vertically downward protruding cleats, a floating board is disposed below the shoe board, and the floating board is provided with through holes corresponding to cleats one by one, and the cleats are movably connected to corresponding through holes; a rebound device is disposed between the shoe board and the floating board, so that the shoe board and floating board form an elastic fit along an axial direction of the cleats by the rebound device; when no external force is exerted, the floating board is pushed downward but not beyond tips of the cleats by the rebound device.

Optionally, at least one rebound device is provided or a plurality of rebound devices are provided at horizontal intervals.

Furthermore, the rebound device includes a spring, one end of the spring being connected to the shoe board and another end of the spring being connected to the floating board.

Optionally, one rebound device corresponds to one cleat, and the spring of the rebound device is coaxially sleeved on the corresponding cleat.

Optionally, the rebound device is distributed in an edge area at a bottom of the shoe board.

Preferably, one or at least two rebound devices are provided at left side and right side of the bottom of the shoe board.

Preferably, the rebound device further comprises a guide post threaded in the spring, the shoe board has a guide sleeve corresponding one-to-one with the guide post of the rebound device, a lower end of the guide post being fixed to the floating board, and an upper end of the guide post being movably threaded in a corresponding guide sleeve.

Preferably, the rebound device further comprises a blocking member, the upper end of the guide post penetrating out of the guide sleeve and connecting with the blocking member; and when no external force is exerted, the spring pushes the floating board downwardly to the tips of the cleats while the blocking member rests against a top surface of the guide sleeve.

As a modification to the above technical solution, one or a plurality of flexible traction members are provided between the shoe board and the floating board, one end of the flexible traction member being connected to the shoe board and another end of the flexible traction member being connected to the floating board, the shoe board limiting a maximum distance the floating board is pushed downwardly by the rebound device by a length of the flexible traction member.

Compared with the prior art, the present invention has beneficial effects: when stepping on the shoe board, the floating board overcomes the elastic force of the rebound device due to the ground force and moves upward along the cleats, allowing the cleats to protrude downward through the floating board to puncture the lawn; and after lifting the shoe board, the rebound device pushes the floating board downward to the tips of the cleats, allowing the leaves, soil, and other debris caught on the cleats during puncturing to be removed smoothly through the floating board, thus achieving a self-cleaning effect.

DETAILED DESCRIPTION OF THE EMBODIMENTS

Figure 1:
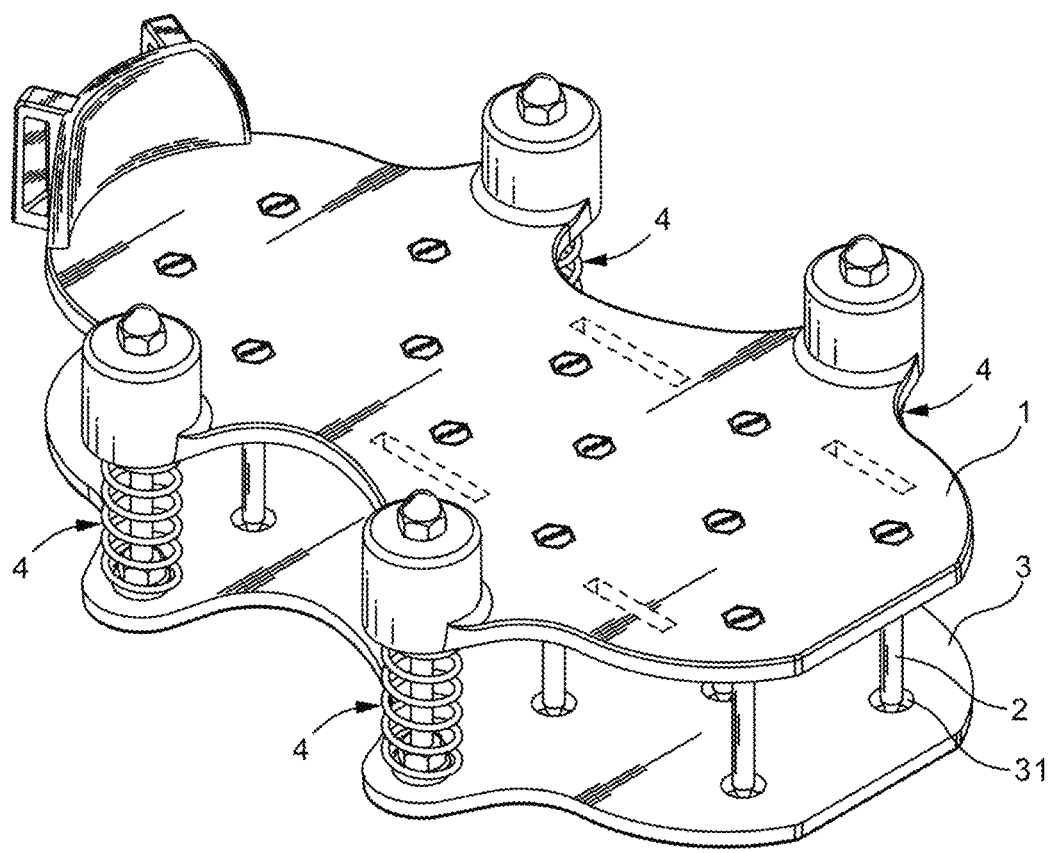
FIG. 1 is a structural diagram of the present application.

As shown in FIG. 1, the present application provides a self-cleaning lawn spike, including a shoe board 1 for wearing on a sole of a foot, a bottom surface of the shoe board 1 having a plurality of vertically downward protruding cleats 2, a floating board 3 is disposed below the shoe board 1, and the floating board 3 is provided with through holes 31 corresponding to the cleats 2 one by one, and the cleats 2 are movably threaded through the corresponding through holes 31; a rebound device 4 is disposed between the shoe board 1 and the floating board 3, so that the shoe board 1 and floating board 3 form an elastic fit along an axial direction of the cleats 2 by the rebound device 4; when no external force is exerted, the floating board 3 is pushed downward but not beyond tips of the cleats 2 by the rebound device.

With the above structure of the self-cleaning lawn spike of the present application, when stepping on the shoe board 1, the floating board 3 overcomes the elastic force of the rebound device 4 due to the ground force and moves upward along the cleats 2, allowing the cleats 2 to protrude downward through the floating board 3 to puncture the lawn; and after lifting the shoe board 1, the rebound device 4 pushes the floating board 3 downward to the tips of the cleats 2, allowing the leaves, soil, and other debris caught on the cleats 2 during puncturing to be removed smoothly through the floating board 3, thus achieving a self-cleaning effect.

Figure 2:
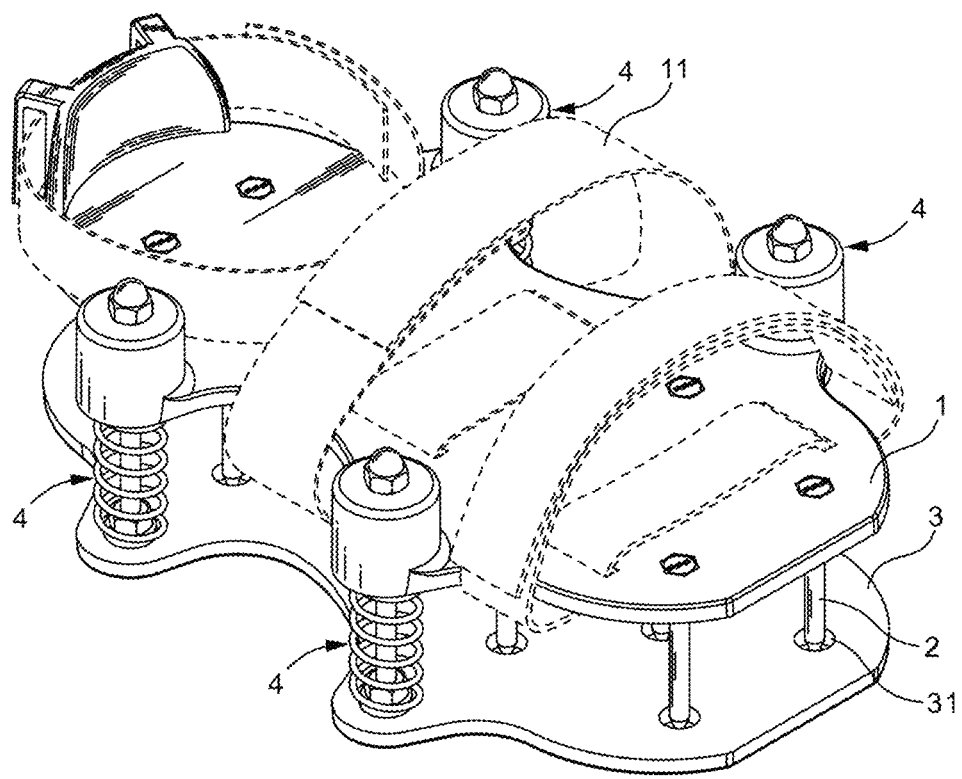
FIG. 2 is a schematic diagram of a working state of the present application.

As shown in FIG. 2, the present application can also be implemented in the manner already known in the prior art, with laces 11 provided on the shoe board 1, and thus the user binds self-cleaning lawn spike of the present application to the foot/shoe by means of the laces 11. In view of the fact that the lacing solution can be precisely known in the prior art, it will not be repeated in the present application.

In the above embodiment, optionally, at least one rebound device 4 is provided or a plurality of the rebound devices 4 are provided at horizontal intervals.

In a feasible embodiment, as shown in FIG. 1, the rebound device 4 includes one spring 41, two ends of the spring 41 are connected to the shoe board 1 and the floating board 3, respectively. When the floating board 3 moves axially along the cleats 2, since a plurality of cleats 2 are provided, the cooperation of the cleats 2 with the corresponding through holes 31 will provide a direction guidance of the movement of the floating board 3. This can assist in the stable axial movement of the floating board 3 along the cleats 2.

Figure 3:
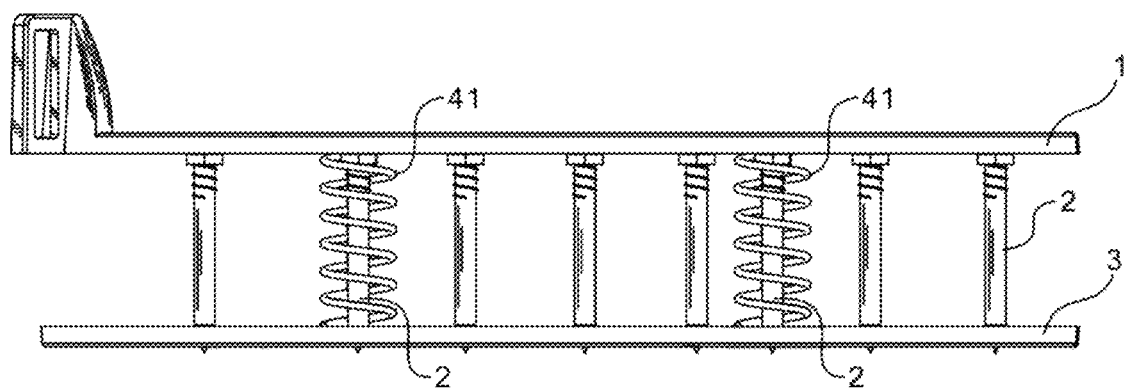
FIG. 3 is a schematic structural diagram of an embodiment of the present application.

Further, as shown in FIG. 3, in one of the above feasible embodiments, regardless of whether the rebound device 4 is provided with at least one cleat 2 or a plurality of cleats 2 arranged at horizontal intervals, each rebound device 4 corresponds to one cleat 2, and the spring 41 of the rebound device 4 is coaxially socketed to the corresponding cleat 2, which further promotes the stable axial movement of the floating board 3 along the cleat 2 while ensuring the normal operation of the spring 41 of the rebound device 4.

Further, in one of the above feasible embodiments, the rebound devices 4 are distributed in the edge area of the bottom of the shoe board 1, enabling the rebound devices 4 to establish a uniformly distributed support connection between the shoe board 1 and the floating board 3, which can also assist in the stable axial movement of the floating board 3 along the cleats 2.

Specifically, in one of the above feasible embodiments, one or at least two rebound devices 4 are provided at left side and right side of the bottom of the shoe board 1. Compared to the user's feet, this arrangement of providing at least two rebound devices 4 on the left and right sides of the foot, respectively, can significantly aid in the stable axial movement of the floating board 3 along the cleats 2.

Figure 4:
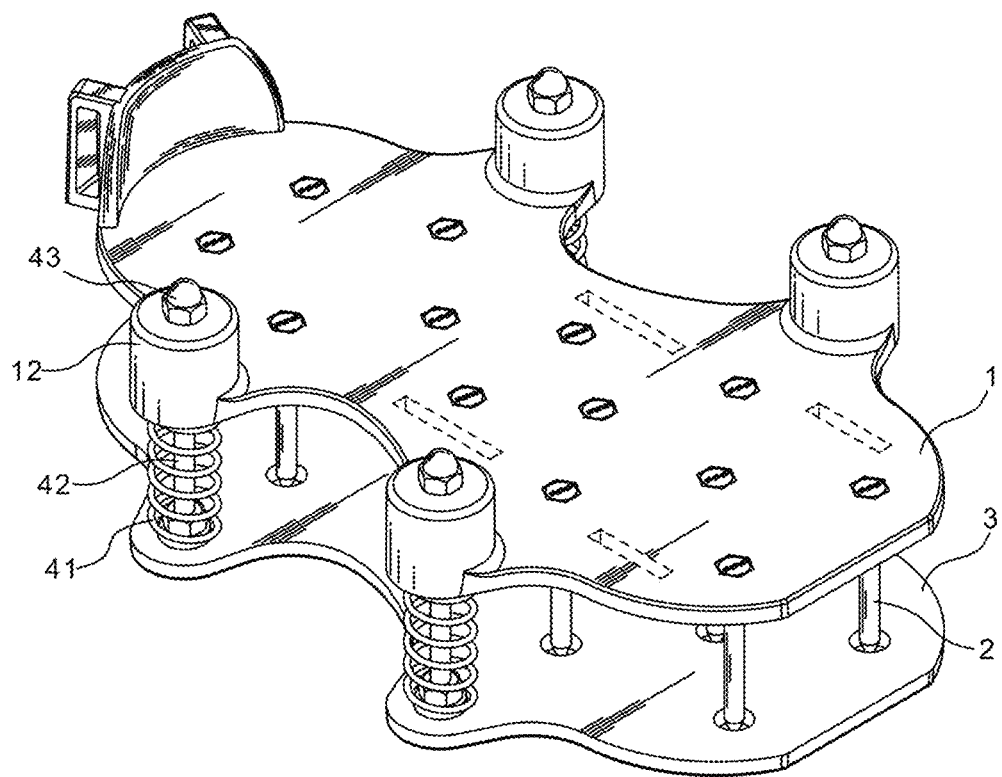
FIG. 4 is a schematic structural diagram of another embodiment of the present application.

In another feasible embodiment, as shown in FIG. 4, one or at least two rebound devices 4 are provided at left side and right side of the bottom of the shoe board 1, respectively. The rebound device 4 includes one spring 41, two ends of the spring 41 are connected to the shoe board 1 and the floating board 3, respectively. The rebound device 4 further includes a guide post 42 threaded in the spring 41, the shoe board 1 has a guide sleeve 12 corresponding one-to-one with the guide post 42 of the rebound device 4, a lower end of the guide post 42 is fixed to the floating board 3, and an upper end of the guide post 42 is movably threaded in a corresponding guide sleeve 12. When the floating board 3 moves axially along the cleats 2, the cooperation of the guide sleeve 12 with the guide post 42 will provide a direction guidance of the movement of the floating board 3. This can also assist in the stable axial movement of the floating board 3 along the cleats 2. Moreover, the rebound device 4 is located on the left and right sides of the bottom of the shoe board 1, the upper end of the guide post 42 moves up just to avoid the user's feet/shoes.

Particularly, the rebound device 4 further includes a blocking member 43, the upper end of the guide post 42 is connected to the blocking member 43 after passing through the guide sleeve 12. When no external force is exerted, the spring 41 pushes the floating board 3 downwardly to the tips of the cleats 2 while the blocking member 43 rests against a top surface of the guide sleeve 12, thereby ensuring that the floating board 3 does not come off the tips of the cleat 2. Preferably, the blocking member 43 is threaded to guide post 42.

Figure 5:
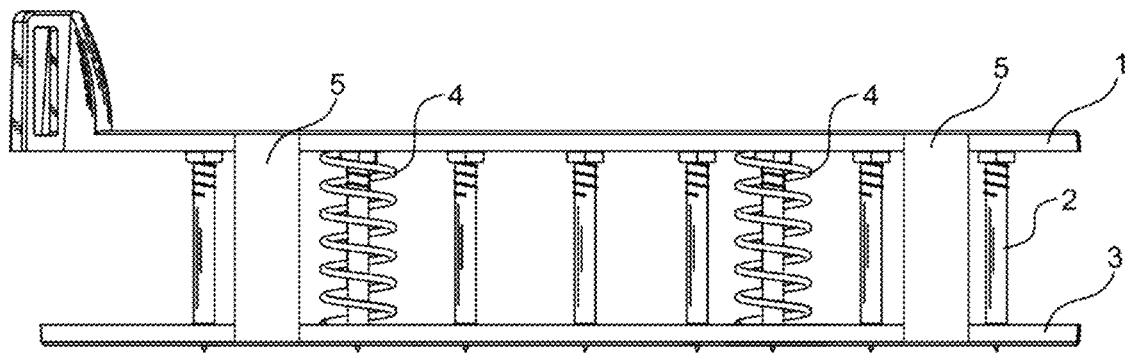
FIG. 5 is a schematic structural diagram of yet another embodiment of the present application.

To ensure that the floating board 3 does not detach from the tips of the cleats 2, as shown in FIG. 5, the present application can also include one or more flexible traction members 5 between the shoe board 1 and the floating board 3. The two ends of the flexible traction members 5 are connected to the shoe board 1 and the floating board 3, respectively. The shoe board 1 limits the maximum distance that the floating board 3 is pushed downward by the rebound device 4 through the length of the flexible traction members. Of course, the flexible traction members 5 can be distributed in an edge area of the bottom of the shoe board 1, as well as in other areas of the bottom of the shoe board 1, so long as which can limit the maximum distance that the floating board 3 is pushed downward by the rebound device 4. Preferably, the flexible traction members 5 are disposed at left and right sides of the bottom of the shoe board 1.

For those skilled in the art, the scope of protection of the present application is not limited to the details of the above exemplary embodiments, and without departing from the spirit or basic features of the present application, all variations of embodiments within the equivalent meaning and scope of protection made by those skilled in the art on the basis of the essentials of the present application shall be included in the present application.

What is claimed is:

1. A self-cleaning lawn spike comprising a shoe board for wearing on a sole of a foot, a bottom surface of the shoe board having a plurality of vertically downward protruding cleats, wherein a floating board is disposed below the shoe board, and the floating board is provided with through holes corresponding to the cleats one by one, and the cleats are movably threaded through corresponding through holes; a rebound device is disposed between the shoe board and the floating board, so that the shoe board and floating board form an elastic fit along an axial direction of the cleats by the rebound device; when no external force is exerted, the floating board is pushed downward but not beyond tips of the cleats by the rebound device, wherein the rebound device comprises a spring and a guide post threaded in the spring, one end of the spring being connected to the shoe board and another end of the spring being connected to the floating board; and wherein one or a plurality of flexible traction members are provided between the shoe board and the floating board, one end of the flexible traction member being connected to the shoe board and another end of the flexible traction member being connected to the floating board, the shoe board limiting a maximum distance the floating board is pushed downwardly by the rebound device by a length of the flexible traction member.

2. The self-cleaning lawn spike according to claim 1, wherein at least one rebound device is provided or a plurality of the rebound devices are provided at horizontal intervals.

3. The self-cleaning lawn spike according to claim 1, wherein one rebound device corresponds to one cleat, and the spring of the rebound device is coaxially sleeved on the corresponding cleat.

4. The self-cleaning lawn spike according to claim 1, wherein the rebound device is distributed in an edge area at a bottom of the shoe board.

5. The self-cleaning lawn spike according to claim 4, wherein one or at least two rebound devices are provided at left side and right side of the bottom of the shoe board.

6. The self-cleaning lawn spike according to claim 5, wherein the shoe board has a guide sleeve corresponding one-to-one with the guide post of the rebound device, a lower end of the guide post being fixed to the floating board, and an upper end of the guide post being movably threaded in a corresponding guide sleeve.

7. The self-cleaning lawn spike according to claim 6, wherein the rebound device further comprises a blocking member, the upper end of the guide post is connected to the blocking member after passing through the guide sleeve; and when no external force is exerted, the spring pushes the floating board downwardly to the tips of the cleats while the blocking member rests against a top surface of the guide sleeve.

* * * * *